United States Patent [19]

Eberhard et al.

[11] Patent Number: 6,098,115
[45] Date of Patent: Aug. 1, 2000

[54] SYSTEM FOR REDUCING STORAGE ACCESS LATENCY WITH ACCESSING MAIN STORAGE AND DATA BUS SIMULTANEOUSLY

[75] Inventors: Raymond J. Eberhard, Endicott, N.Y.; John M. Kaiser, deceased, late of Cedar Park, Tex., by Eileen T. Kaiser, executrix; Warren E. Maule, Cedar Park, Tex.; Eddie Wong; Vincent P. Zeyak, Jr., both of Apalachin, N.Y.

[73] Assignee: International Business Machines Corporation, Armonk, N.Y.

[21] Appl. No.: 09/057,409

[22] Filed: Apr. 8, 1998

[51] Int. Cl.⁷ ...................................................... G06F 13/00
[52] U.S. Cl. .................................. 710/7; 710/7; 710/21; 711/137; 711/140; 711/168
[58] Field of Search ...................................... 711/137, 140, 711/168; 710/21, 74, 7; 395/425, 458

[56] References Cited

U.S. PATENT DOCUMENTS

| | | | |
|---|---|---|---|
| 4,794,521 | 12/1988 | Ziegler et al. | 364/200 |
| 4,905,184 | 2/1990 | Giridhar et al. | 364/900 |
| 5,018,063 | 5/1991 | Liu | 364/200 |
| 5,073,851 | 12/1991 | Masterson et al. | 395/425 |
| 5,185,875 | 2/1993 | Chinnaswamy et al. | 395/425 |
| 5,265,236 | 11/1993 | Mehring et al. | 395/425 |
| 5,325,508 | 6/1994 | Parks et al. | 395/425 |
| 5,353,429 | 10/1994 | Fitch | 395/425 |
| 5,555,395 | 9/1996 | Parks | 395/472 |
| 5,557,768 | 9/1996 | Braceras et al. | 395/458 |
| 5,594,887 | 1/1997 | Osaka | 395/471 |
| 5,598,550 | 1/1997 | Shen et al. | 395/473 |
| 5,625,842 | 4/1997 | Dalrymple | 395/842 |
| 5,636,364 | 6/1997 | Emma et al. | 395/467 |
| 5,696,989 | 12/1997 | Miura et al. | 395/844 |
| 5,729,711 | 3/1998 | Okamoto | 395/415 |
| 5,742,789 | 4/1998 | Ofer et al. | 395/438 |
| 5,758,106 | 5/1998 | Fenwick et al. | 395/305 |
| 5,761,708 | 6/1998 | Cherabuddi et al. | 711/118 |
| 5,813,030 | 9/1998 | Tubbs | 711/118 |
| 5,930,832 | 7/1999 | Heaslip et al. | 711/207 |

FOREIGN PATENT DOCUMENTS

| | | | |
|---|---|---|---|
| 62-219146 | 3/1986 | Japan | G06F 12/08 |
| 363184150 | 7/1988 | Japan . | |
| 403123951 | 5/1991 | Japan . | |
| 404017052 | 1/1992 | Japan . | |
| 9-26930 | 1/1997 | Japan | G06F 13/16 |
| 9-293054 | 11/1997 | Japan | G06F 15/16 |

Primary Examiner—Thomas C. Lee
Assistant Examiner—Chun Cao
Attorney, Agent, or Firm—Shelley M Beckstrand

[57] ABSTRACT

System and method reading data from storage by speculatively accessing storage and overlapping data bus access with status determination, thereby reducing storage read access latency. Also, a system and method is provided for reducing storage read access latency by accessing a data bus substantially simultaneously with availability of data from storage. Upon receipt of a storage read request, and before status determination, the requested data is read from storage. Optionally, depending upon bus architecture or the need to minimize control circuitry, control of the data bus may speculatively be sought so that data may be loaded to the data bus upon availability from main storage, still whether or not status has been resolved. Subsequently, if status cancels the read request, further data bus loading is terminated.

9 Claims, 8 Drawing Sheets

| FIG. 2A |
|---|
| FIG. 2B |

FIG. 2

| FIG. 3A | FIG. 3B |
|---|---|

FIG. 3

| FIG. 4A | FIG. 4B |
|---|---|

SYSTEM FOR REDUCING STORAGE ACCESS LATENCY WITH ACCESSING MAIN STORAGE AND DATA BUS SIMULTANEOUSLY

BACKGROUND OF THE INVENTION

1. Technical Field of the Invention

This invention pertains to reducing storage read access latency. In particular, this invention improves latency by speculatively accessing storage and overlapping data bus access with status determination.

2. Background

The access time of requested data from storage, that is the latency associated with either operand or instruction access, affects the performance of any processor performing such requests.

Storage requests which require more than one machine cycle to evaluate and post status to determine whether main storage should be accessed, contribute to the access time of the requested data.

Requests which must cross shared buses also contribute to data access latency since use of the bus must be requested and granted prior to the transmission of the request and request's data.

One approach to reducing storage read request latency is to provide an owned status memory for tracking whether data in main memory is owned by main memory or by cache. This allows access to main memory to occur simultaneously with access to cache when main memory is owned by main memory. Then, when cache status (hit or miss) is determined, if main memory is owned by main memory and the data accessed simultaneously with cache access, the main memory data is available for transfer to a data bus immediately upon cache miss status being signaled. This approach to overlapping cache and memory access to reduce latency requires the addition of the owned status memory, which contributes to the cost and complexity of the memory controller function.

It is an object of the invention to improve storage access latency.

It is a further object of the invention to improve storage access latency during read operations.

It is a further object of the invention to reduce storage access latency by obtaining control of a data bus substantially simultaneously with availability to that data bus of data read from storage.

It is a further object of the invention to improve storage access latency by speculatively accessing storage pending status determination.

It is a further object of the invention to reduce control logic complexity and reduce busy time of the processor data bus while obtaining control of the data bus substantially simultaneously with availability of data from storage.

It is a further object of the invention to reduce control logic complexity by enabling simultaneous access to main memory and cache memory without the necessity of maintaining an owned status memory.

SUMMARY OF THE INVENTION

In accordance with the invention, a system and method is provided for reading data from storage by speculatively accessing storage and overlapping data bus access with status determination, thereby reducing storage read access latency.

In accordance with a further embodiment of the invention, a system and method is provided for reducing storage read access latency by accessing a data bus substantially simultaneously with availability of data from storage.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 2A, 2B and 2C, configured as shown in FIG. 2, are a flow diagram of a preferred embodiment of the method of the invention.

BEST MODE FOR CARRYING OUT THE INVENTION

Figure 1:
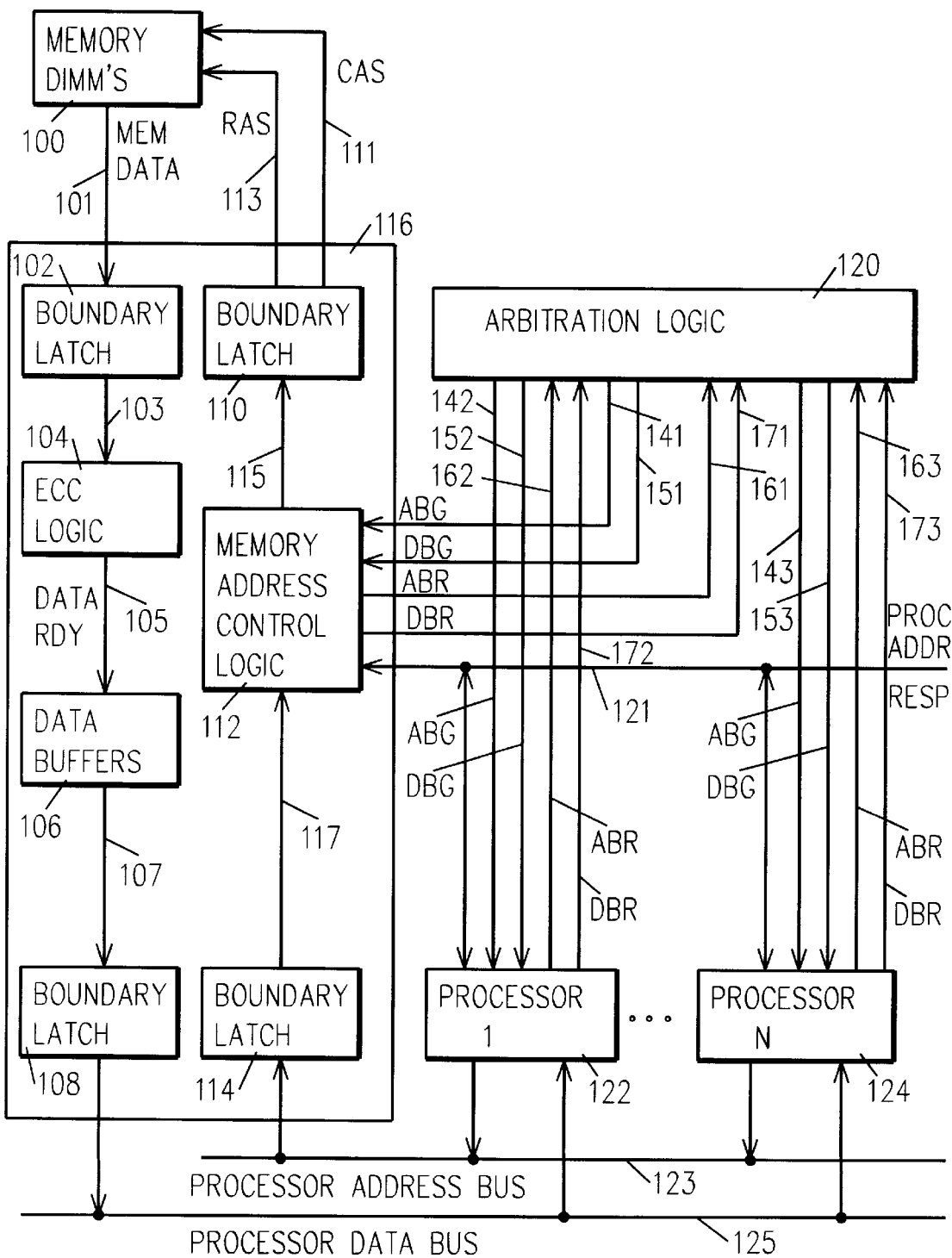
FIG. 1 is a system diagram of a preferred embodiment of the invention.

Referring to FIG. 1, a system diagram illustrates a preferred embodiment of the invention for reading data from main memory to a processor data bus. Main memory 100 comprises, in this preferred embodiment of the invention, a plurality of dual in-line memory modules (DIMMs) which are addressed by row address strobe (RAS) line 113 and column address strobe (CAS) line 111. CAS 111 and RAS 113 represent the address received from address bus 123 as converted to access memory DIMMs 100. Memory data is fed from memory 100 to boundary latch 102 on memory data lines 101, and thence on lines 103 to error correction code (ECC) logic 104 and thence on data ready to transfer line 105 to data buffers 106. Data is fed from data buffers 106 on lines 107 to boundary latch 108, and thence to processor data bus 125 and processors 122, 124.

Addresses on processor address bus 123 from processors 122, 124 are fed to boundary latch 114, thence on line 117 to memory address control logic 112, and thence on line 115 to boundary latch 110.

Bidirectional processor address response lines 121 interconnect control logic 112, and processors 122, 124.

Address bus grant (ABG) lines 141–143 and data bus request (DBR) lines 151–153 are fed to arbitration logic 120 from control logic 112 and processors 122, 124, respectively. Address bus request lines 161–163 and data bus request lines 171–173 are fed to arbitration logic 120 from control logic 112 and processors 122, 124, respectively.

Processor address bus request (ABR) lines 161–163 carry request signals from a device 112, 122, 124 attached to processor address bus 123 (in this case, a device issuing a command to memory controller 112) to processor bus arbitration logic 120 to request the processor address bus 123 to transfer an address. A request signal on one of lines 161–163 is activated and held until a processor address bus grant (ABG) signal is received on the corresponding line 141–143, then deactivated on the clock cycle following the grant.

Processor address bus grant (ABG) lines 141–143 carry grant signals from processor bus arbitration logic 120 to a device 112, 122, 124 attached to processor address bus 123 to indicate that processor address bus 123 is available to the selected device for an address transfer. A grant signal on lines 141–143 is a single cycle pulse that processor 122, 124 uses to deactivate its processor address bus request signal 162, 163 and to drive an address to bus 123.

Processor address bus 123 is used to transfer commands to and from devices 112, 122, 124 attached in the system.

Processor response bus 121 is a bus combining responses from all devices 112, 122, 124 attached to processor address bus 123 to indicate that a previous command is valid for execution. By status is meant whether or not a cache on a device 122, 124 has more current data (cache hit or miss), or whether the device 122, 124 is too busy to check its cache and respond on processor address response bus 121 during the architected cycle. In accordance with this preferred embodiment of the invention, all devices 122, 124 snooping bus 123 are required to respond on bus 121 in the same cycle. Alternatively, responses could be returned on bus 121 in different cycles from different processors 122, 124, and a status determination made in controller 112 when all required or expected responses have been received. Insofar as it is pertinent to this invention, possible status responses are (a) cache hit, (b) cache miss, (c) device busy; where responses (a) and (c), in effect, result in canceling this storage 100 read access.

Row address strobe (RAS) signal line 113 carries a signal to memory chips 100 installed in the system to indicate that the row address for a request is active at memory 100.

Column address strobe (CAS) signal line 111 carries a signal to memory chips 100 installed in the system to indicate that the column address for a request is active at memory 100.

Data memory bus 101 contains the data read out of memory 100 in the system prior to its transfer into the memory controller 116.

Data ready to transfer to processor bus lines 105 are an internal bus in memory controller 116 that contain data that is to be transferred to processor data bus 125. Data on bus 105 may be transferred to processor data bus 125 in the next cycle or may be held in data buffers 106 for n cycles until the data bus grant signal 151 is received by controller 116 from arbitration logic 120.

Processor data bus request (DBR) lines 171–173 carry request signals from a device 112, 122, 124, respectively, attached to processor data bus 125 (in the case of a storage read operation in accordance with the preferred embodiments of the invention, from control logic 112 in memory controller 116) to processor bus arbitration logic 120 to request the processor data bus 125 to transfer a packet of data. A signal on one of lines 171–173 is activated and held until the corresponding processor data bus grant signal 151–153 is received, and then it is deactivated on the clock cycle following the grant.

Processor data bus grant (DBG) lines 151–153 carry grant signals from processor bus arbitration logic 120 to a device 112, 122, 124, respectively, attached to processor data bus 125 to indicate that processor data bus 125 is available for a data transfer. A signal on one of DBG lines 151–153 is a single cycle pulse that the corresponding device 112, 122, 124 uses to deactivate its processor data bus request signal 171–173, respectively, and to drive data to processor data bus 125.

Processor data bus 125 is used to transfer data to and from the devices 112, 122, 124 attached in the system, and in the case of a storage read operation in accordance with the invention, it is used to transfer data from memory 100 via storage controller 116 to one of processors 122, 124.

Referring to FIG. 1, in operation of the preferred embodiments of the invention, to lessen the performance impact of latency between a request's address on bus 123 and its status on bus 121, a controller 116 accesses storage 100 with the request's address, and overlaps this access with the time used to calculate status. If status favoring the transmission of data (cache miss, or the like,) is received from all caches at processors on bus 121 prior to the access of main storage 100, a data bus request 171 is sent to the data bus arbiter 120 in a manner which overlaps the data latency, also improving performance. In this sense, data latency refers to the time between receipt of an address on address bus 123 by memory controller 116, and the delivery of the first beat of data to data bus 125 from controller 116.

If requested data is accessed from memory 100 and ready on data ready bus 105 to deliver on bus 125 to the requester, i.e., processor 122, before status is calculated (received from bus 121), the accessed data is stored in a buffer 106. Once status is calculated, and if it favors the transmission of the requested data, a data bus request 171 is sent to the bus arbiter 120. When use of the bus 125 is granted by a DBG signal on line 151, data is accessed from the buffer 106 and is delivered on bus 125 to the requester 122. When permitted by the bus 125 architecture, the first beat of data is placed on the bus 125 during the same cycle as the status (address response 121) and then possibly terminated once the response is decoded if the decoded response indicates that the command is canceled. Alternatively, when the bus architecture does not permit the cancellation of a command one data is loaded to the bus, the first beat of data is placed on the bus 125 during the cycle following decoding of status 121 if the command is not canceled. For the purposes of this invention, a buffer 106 is defined as having a significantly faster access time when compared to main storage 100, also improving performance.

If a status 121 calculation for a request precedes the data access and the status favors the transmission of requested data, the data bus 125 is requested by a signal from control logic 112 on DBR line 171 in a manner which delivers data to the bus 125 coincident with both the availability of data on data ready bus 105 and the availability of the data bus 125. This technique improves performance by busying the bus 125 with actual data transfer only, thereby increasing the availability of the bus for other requesters. If the system data bus 125 is unavailable when data becomes available, the data is accumulated in a buffer 106 and is transferred to the bus 125 from the buffer 106 when the bus 125 becomes available.

If status on response bus 121 associated with a storage read request indicates the request should not be honored, data accessed from storage 100, if any, is discarded. Requests received on address bus 123 by controller 116 are FIFO queued in memory address control logic 112. If due to the queueing nature of the controller 112 the request (which comes on bus 123) could not be issued to the storage access mechanism 110 before the status is calculated and received on bus 121, the queued request is terminated to improve performance. Terminating the queued storage request before being issued to the storage access mechanism increases the availability of the storage access mechanism 110 to perform other accesses.

If no queued requests already exist in the controller 112 when a request is received, the request is forwarded directly to the storage access mechanism 110 without first queueing it, thereby reducing the latency of access and improving performance.

Figure 3A:
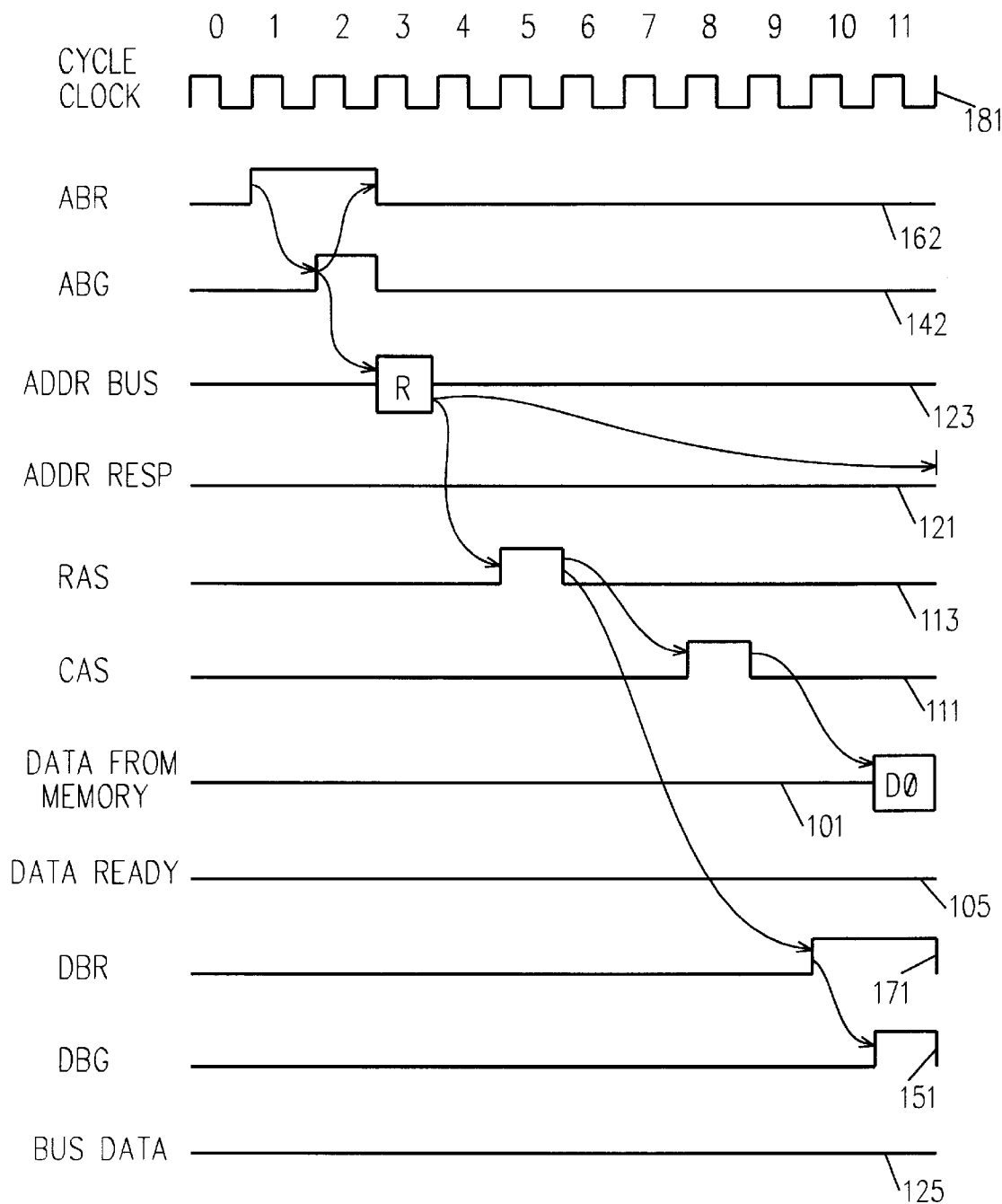
FIGS. 3A and 3B, configured as shown in FIG. 3, are a timing diagram illustrating a first specific example of the operation of the system and method of the invention.
Figure 3B:
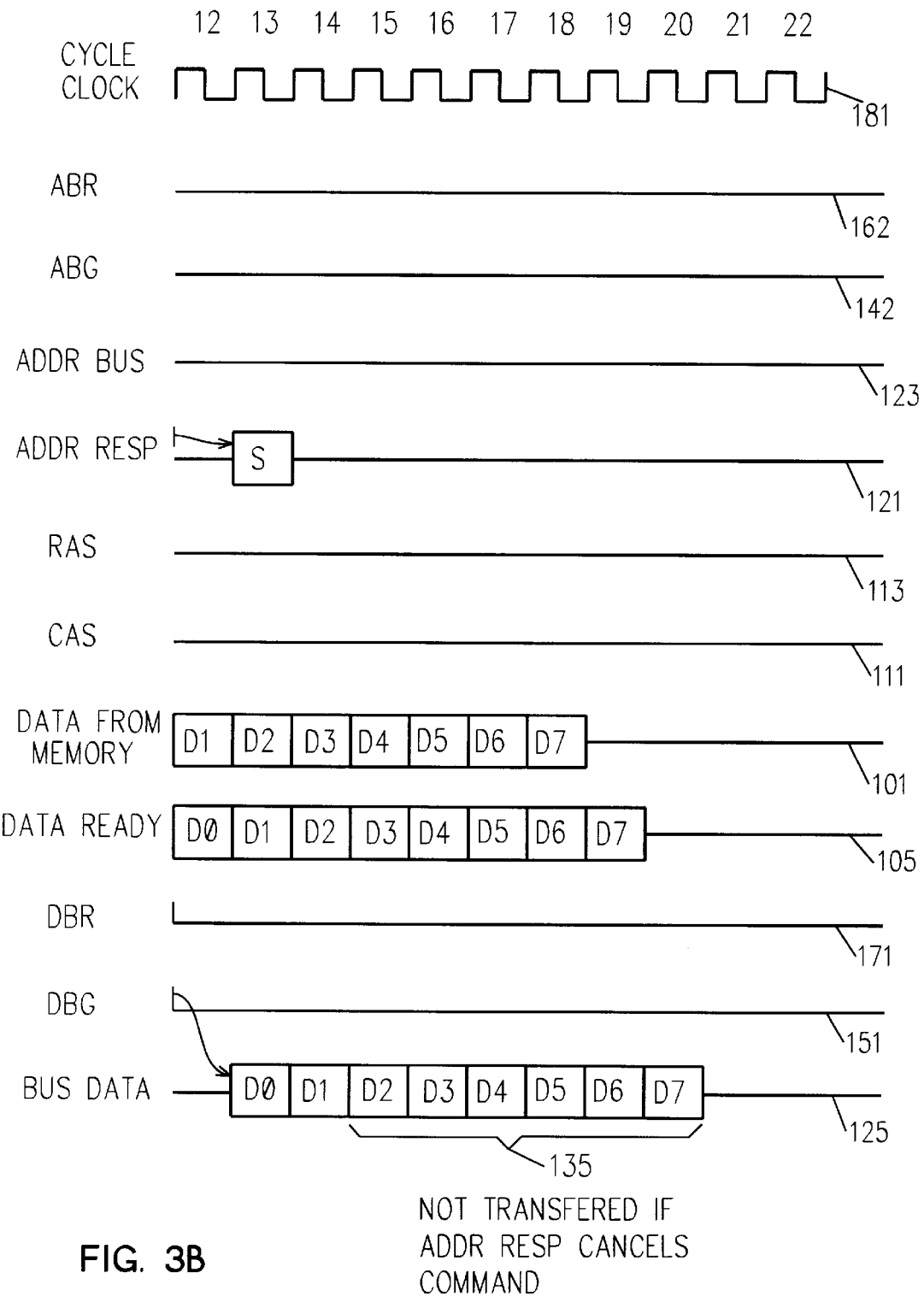

Referring to FIG. 1 in connection with FIG. 3, in accordance with a preferred embodiment of the invention, a speculative read request is a request from a device 122, 124 in the system to memory controller 116 that the memory controller will execute prior to knowing if the request will be canceled by another device 124, 122 in the system due to device busy condition or a coherency problem. Coherency refers to the update order maintained with respect to main storage. That is, that update order must be assured as consistent such that any processor reading storage will see all previous updates. If processor 122 updates a given storage 100 location, and then processor 124 updates that storage location, coherency assures that some other processor reading that storage location will receive data which reflects the processor 124 update.

To issue the speculative read request, a device 122, 124 requests the address bus 123 from the bus arbiter 120. Once granted, the command will be issued to bus 123 for execution by memory controller 116 and to be snooped by the other devices 124, 122 on bus 125. A device 124, 122 snoops the read command on address bus 123 to check status; that is, to determine if it has a newer copy of the data requested than is in memory 100, or if it is busy and unable to check for a new copy. Some fixed number of cycles later (in this case, 10 cycles, as shown in FIG. 3), a status response is issued to the bus 121 to either validate the read command or to cancel the command due to busy conditions in one of the bus snoopers 124, 122 or modified data in one of the attached caches (not shown) on bus 123.

Memory controller 116 starts execution of the command on address bus 123 as soon as it is received (cycle 4 in FIG. 3). It does not wait until the command is validated, which occurs at cycle 13 in FIG. 3. At some point in the execution of the command the status response will be received on bus 121 and if the command is canceled by the response (cycle 14 in FIG. 3) memory controller 116 terminates the read operation. A status response is required from all devices 122, 124 (other than the requestor) before status is really known. That is, if there are three processors 122, 124, . . . , with caches on bus 123, 124, and one requests data from memory 100; a coherency problem or busy condition could occur in either of the other two.

Referring to FIG. 3, in the timing shown, memory controller 116 has reached a point in the command execution where data is actually placed on processor data bus 125. If the command is canceled by response 121, memory controller 116 will not send the remaining portion of the data on the bus 125 (data in cycles 15 thru 20). In addition, the device 122, 124 receiving the data will see the cancel response on line 121 and will ignore the data that it has already received over bus 125.

If response 121 is received earlier, memory controller 116 may not have started sending data out to bus 125 but will still cancel the command internally. This may mean removing a data bus request signal 171 from the bus arbiter, or just terminating the request (not shown) to memory chips 100.

By speculatively starting the read command the system performance is improved since the latency for a read request is reduced.

Further in accordance with an embodiment of the invention, memory controller 116 improves performance by speculatively requesting data bus 125 for the data transfer. In cycle 10 (FIG. 3), memory controller 116 requests the data bus 125 for a transfer of data prior to having the data available on bus 105 to transfer to data bus 125. In the case shown in FIG. 3, the DBR 171 request is issued in cycle 10 and the data is not available at bus 105 for latching at 108 for transfer to bus 125 until cycle 13. Memory controller 116 can issue this DBR 171 request since it knows when the data will be returned from memory 100 and how long it takes for a DBG grant 151 to be received from the arbiter 120 (best case grant, bus 125 not busy). Requesting the data bus 125 prior to having data available allows the latency for the data bus grant (the time from issuing DBR 171 to the time when DBG 151 is received) to be overlapped with the memory read latency (read access time of the DRAM's 100, or the time from the first of RAS 113 or CAS 111 until data is available at data ready bus 105) and allows data to be issued to processor data bus 125 in the first cycle that is available.

Figure 2A:
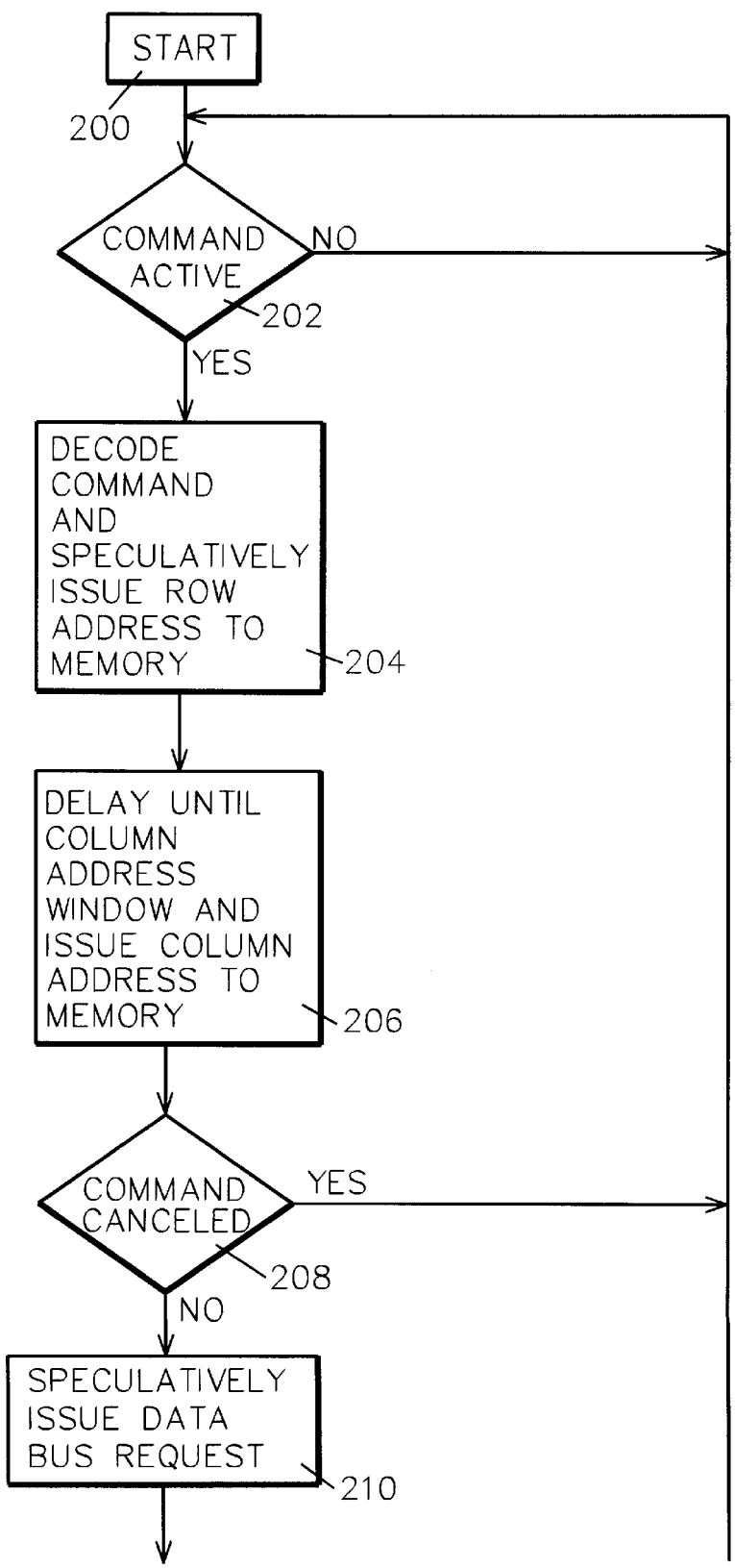
Figure 2B:
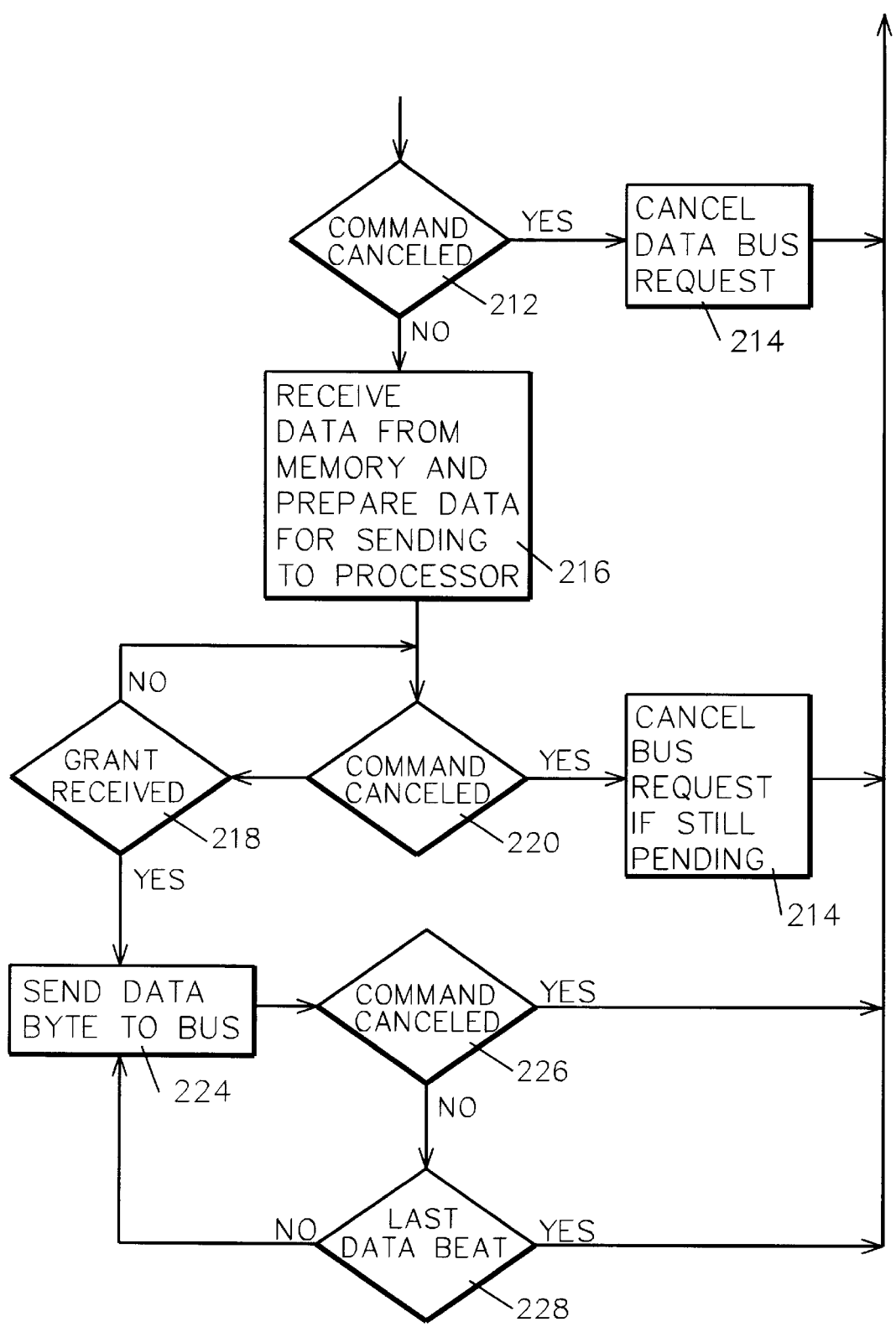

Referring to FIG. 2, the speculative read process 200 executed by memory controller 116 in accordance with the preferred embodiment of the method of the invention is set forth. In step 202, control logic 112 determines if a read command is active on processor address bus 123 (that is, latched in boundary latch 114). If so, in step 204, logic 112 decodes the command and speculatively issues (with strobe signal 113) the row address to memory 100; and in step 206, after a delay until the column address window, issues the column address (with strobe signal 111) to memory 100. In step 208, control logic 112 determines if the command has been canceled by a status indication on bus 121 and, if not, in step 210 speculatively issues a data bus request on line 171. If in step 208 it is determined that the command was canceled, control logic 112 returns to step 202 to await a new active command. After issuing the speculative data bus request in step 210, in step 212 control logic 112 again determines if the command has been canceled and, if so, in step 214 control logic 112 cancels the data bus request 171. If the command has not been canceled, in step 216 memory controller 116 receives data from memory 100 and prepares it in ECC logic block 104 and buffers 106 for sending to processor 122. If, in step 220, address control logic 112 determines that the read command received on address bus 123 from processor 122 has been canceled, in step 222 it cancels data bus request 171 if still pending. If not, in steps 220 and 218 control logic waits for the command to be canceled or the arbitration logic 120 to return a data bus grant signal on line 151. In step 224, memory controller 116 latches (latch 108) a data byte to bus 125, and continues send a new data beat (where a beat of data is the width of the data bus) during each machine clock cycle until it is determined in step 226 that the read command has been canceled or until it is determined in step 228 that the last data beat has been sent.

Referring to FIG. 3, by way of explanation of a specific example of speculative read timings in accordance with a first embodiment of the invention, during cycle 1, processor 122 issues ABR on line 162 to request the address bus 123 to transfer a read command. During cycle 2, arbiter 120 responds with ABG 152 to grant address bus 123 to processor 122. During cycle 3, processor 122 places the address command on address bus 123. During cycle 4, memory controller 116 decodes the command on address bus 123 to speculatively issue it to memory 100 in cycle 5. During cycle 5, the row address is issued to memory modules 100 and strobed by RAS line 113. During cycle 8, the column address is issued to memory modules 100 and strobed by CAS line 111. During cycle 10, memory controller 116 issues a DBR request 171 for ownership of data bus 125 to transfer data in response to the read command received on address bus 123 from processor 122. This DBR request 171 is issued prior to data being returned from memory 100 on memory data line 101. During cycle 11, a first cycle of data is returned from memory on line 101 and data bus grant (DBG) 151 is returned from arbiter 120. During cycle 12, ECC correction is conducted by ECC logic 104 on data from memory 100. During cycle 13, the first cycle of data is transferred on data bus 125 based on the grant 151 in cycle 11. Status bus 121 carries a valid indication for data transfer. During cycle 14, memory controller 116 decodes status 121 and if the result cancels the read command, terminates data transfer (beats D2–D7) 135 from memory 100 to data bus 125. During cycle 15, data transfer from memory 100 to data bus 125 continues if the read command had not been canceled.

Figure 4A:
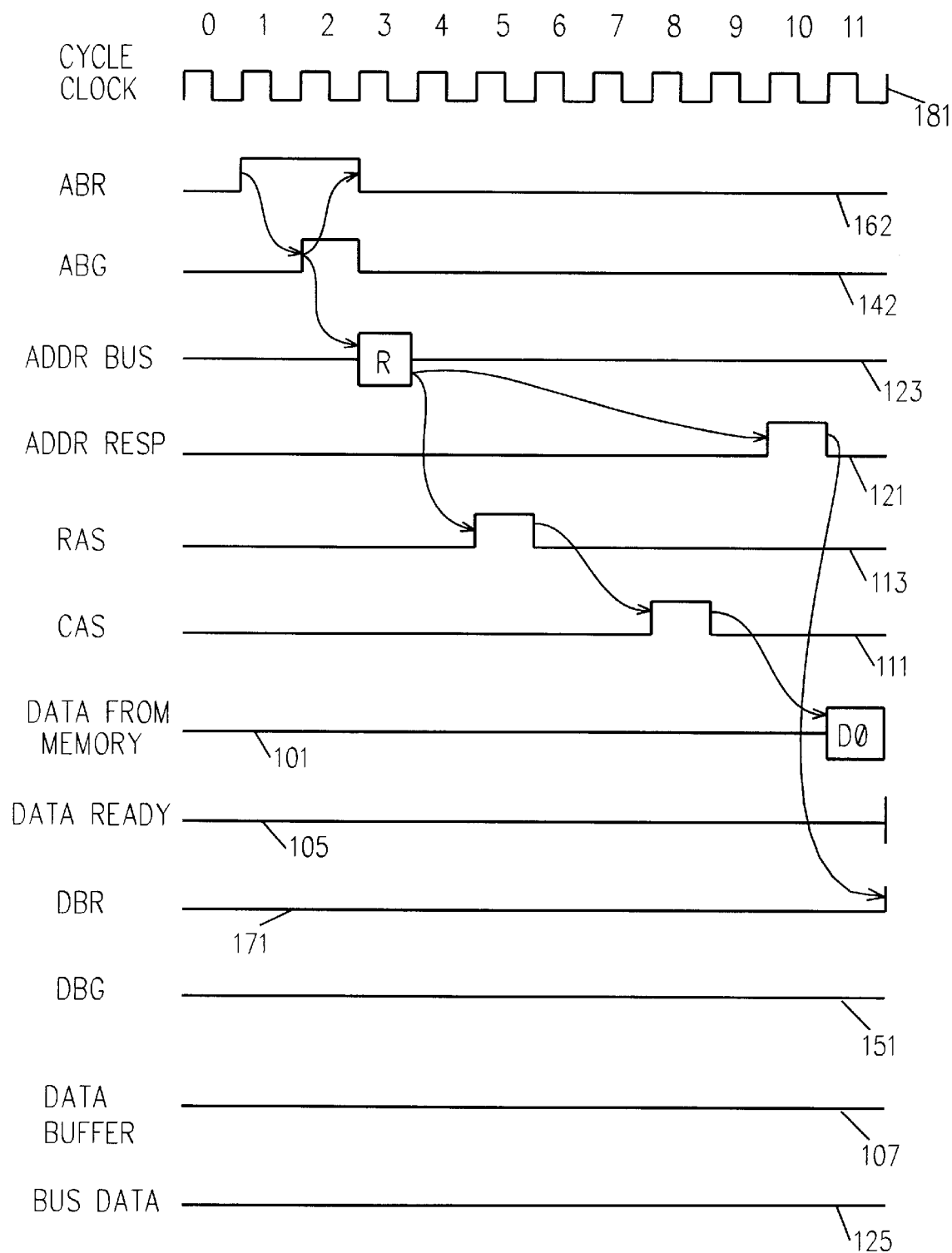
FIGS. 4A and 4B, configured as shown in FIG. 4, are a timing diagram illustrating a second specific example of the operation of the system and method of the invention.
Figure 4B:
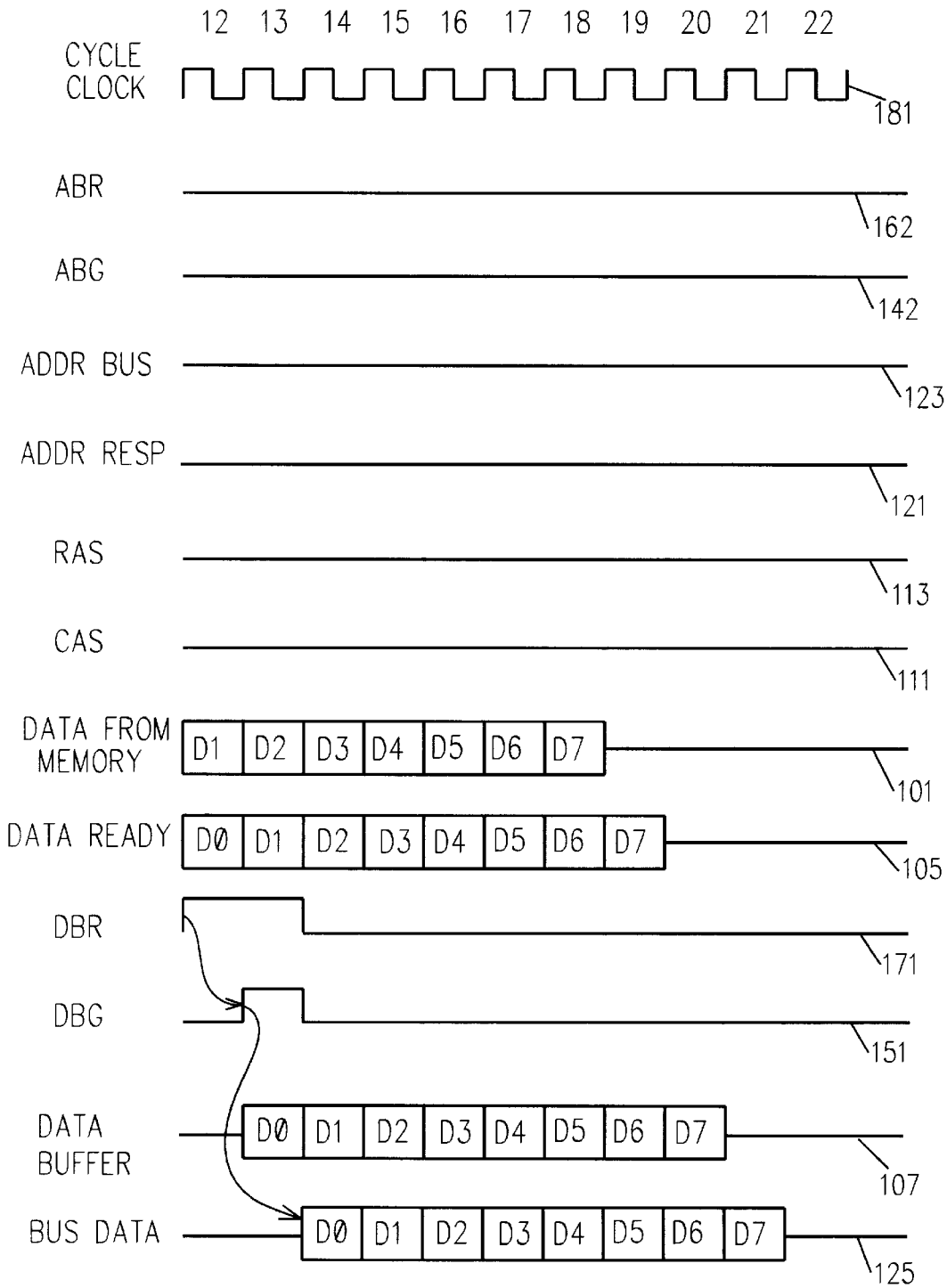

Referring to FIGS. 4A and 4B, in accordance with an alternative embodiment of the invention which requires less complex control circuitry and allows for obtaining control of the data bus substantially simultaneously with availability of data from storage, a data bus request (DBR) 171 is not issued until the processor address response status 121 is known. This alternative embodiment is particularly advantageous for use in connection with a storage controller which is incapable of canceling a bus request once issued, or a processor incapable of handling speculative data. By "substantially simultaneously" is meant that control of the data bus is obtained just as data becomes available to load to the data bus. This is achieved by timing the issuance of the DBR request on line 171. That is, for a best case response by arbitration logic (which is expected if data bus 125 is idle or becoming idle), control logic 112 can assume that the DBG 151 response will be received, say, three cycles after the DBR 171 request is issued, and time that receipt of DBG 151 to occur at the time expected (which depends on the memory configuration) for data to reach data ready bus 105 following the access of memory 100 by RAS 113 and CAS 111.

Referring to FIGS. 3 and 4 a first and a second embodiment of the invention are presented, respectively. In accordance with both embodiments, a speculative access is made of memory 100 (issuing the memory 100 RAS/CAS addresses before status is received and decoded on bus 121). In the first embodiment of the invention (FIG. 3), once RAS/CAS is issued, the DBR 171 is issued requesting data bus 125, and data is loaded from memory 100 to bus 125 as soon as DBG 151 is received back—whether or not the status response is received on bus 121. If the status on 121 cancels the read request, then transfer of further beats of data to bus 125 is stopped. On the other hand, in the second embodiment (FIG. 4), the DBR 171 is NOT issued until status is decoded from bus 121. This second embodiment is preferred, for example, when all processors 122, 124 may not be architected to snoop bus 123/125 and therefore, are not expecting a command instructing them to discard data received from a now canceled operation.

Advantages over the Prior Art

The advantages of the system and method of the preferred embodiments of this invention improving storage access latency.

It is a further advantage of the invention that storage access latency during read operations is improved.

It is a further advantage of the invention storage access latency reduced by obtaining control of a data bus substantially simultaneously with availability of data from storage.

It is a further advantage of the invention that storage access latency is improved by speculatively accessing storage pending status determination.

It is a further advantage of the invention that control logic complexity is reduced and busy time of the processor data bus is reduced while improving performance by obtaining control of the data bus substantially simultaneously with availability of data from storage.

It is a further advantage of the invention that control logic complexity is reduced by enabling simultaneous access to main memory and cache memory without the necessity of maintaining an owned status memory.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

We claim:

1. Method for operating a storage access mechanism, comprising the steps of:

responsive to a storage read request, simultaneously accessing storage and requesting data bus access while awaiting status determination;

loading data retrieved from storage to said data bus upon receiving control of the data bus irrespective of whether status determination has been completed; and canceling data bus loading upon determining that status cancels the storage read request.

2. Method for operating a storage access mechanism, comprising the steps of:

responsive to a storage read request, accessing storage while awaiting status determination;

accessing a data bus access so as to obtain control of said data bus substantially simultaneously with availability of data from storage;

loading data retrieved from storage to said data bus upon receiving control of the data bus irrespective of whether status determination has been completed; and canceling data bus access upon determining that status cancels the storage read reguest.

3. Storage access system, comprising:

a main storage;

a data bus;

an address bus;

a storage controller responsive to a storage read request on said address bus for simultaneously accessing said main storage and requesting control of said data bus while awaiting status determination;

said storage controller being further operable to load data retrieved from said main storage to said data bus upon receiving control of the data bus irrespective of whether status determination has been completed; and thereafter to cancel loading of data to said data bus upon determining that status cancels the storage read request.

4. A storage access system, comprising:

a main storage;

a data bus;

an address bus;

a storage controller responsive to a storage read request on said address bus for accessing said main storage simultaneously with status determination;

said storage controller being further operable to access said data bus access so as to obtain control of said data bus irrespective of whether status determination has been completed; to load data retrieved from storage to said data bus upon receiving control of the data bus; and thereafter to cancel loading of data to said data bus upon determining that status cancels said storage read request.

5. A program storage device readable by a machine, tangibly embodying a program of instructions executable by a machine to perform method steps for accessing main storage, said method steps comprising:

responsive to a storage read request, simultaneously accessing storage and requesting data bus access while awaiting status determination;

loading data retrieved from storage to said data bus upon receiving control of the data bus irrespective of whether status determination has been completed; and canceling data bus loading upon determining that status cancels the storage read request.

6. An article of manufacture comprising:

a computer useable medium having computer readable program code means embodied therein for access main storage, the computer readable program means in said article of manufacture comprising:

computer readable program code means for causing a computer to effect, responsive to a storage read request, simultaneously accessing storage and requesting data bus access while awaiting status determination;

computer readable program code means for causing a computer to effect loading data retrieved from storage to said data bus upon receiving control of the data bus irrespective of whether status determination has been completed; and computer readable program code means for causing a computer to effect canceling data bus loading upon determining that status cancels the storage read request.

7. A method of using a storage controller in a storage access system including a data bus, and address bus, and a main storage, comprising the steps of:

responding to a storage read request on said address bus with a simultaneous request to access said main storage and said data bus;

while awaiting status determination, receiving control of said data bus; and upon said status determination canceling said storage read request, canceling data bus loading.

8. A program storage device readable by a machine, tangibly embodying a program of instructions executable by a machine to perform method steps for using a storage controller in a storage access system including a data bus, an address bus, and a main storage, said method steps comprising:

responding to a storage read request on said address bus with a simultaneous request to access said main storage and said data bus;

while awaiting status determination, receiving control of said data bus; and upon said status determination canceling said storage read request, canceling data bus loading.

9. A storage controller, comprising:

means responsive to a storage read request on an address bus for simultaneously accessing main storage and requesting control of a data bus while awaiting status determination; and means for loading data retrieved from said main storage to said data bus upon receiving control of the data bus irrespective of whether status determination has been completed; and thereafter canceling loading of data to said data bus upon said status determination canceling said storage read request.

* * * * *